United States Patent [19]
Brown

[11] Patent Number: 5,960,207
[45] Date of Patent: Sep. 28, 1999

[54] SYSTEM AND METHOD FOR REDUCING POWER LOSSES BY GATING AN ACTIVE POWER FACTOR CONVERSION PROCESS

[75] Inventor: Alan E. Brown, Georgetown, Tex.

[73] Assignee: Dell USA, L.P., Round Rock, Tex.

[21] Appl. No.: 08/787,499

[22] Filed: Jan. 21, 1997

[51] Int. Cl.$^6$ ..................................................... G06F 1/26
[52] U.S. Cl. ............................... 395/750.01; 395/750.05; 363/98
[58] Field of Search .................. 395/750.01, 750.05; 363/44, 46, 98, 37; 323/207, 305

[56] References Cited

U.S. PATENT DOCUMENTS

| | | | |
|---|---|---|---|
| 5,315,214 | 5/1994 | Lesea | 315/209 R |
| 5,416,687 | 5/1995 | Beasley | 363/44 |
| 5,600,549 | 2/1997 | Cross | 363/46 |
| 5,754,419 | 5/1998 | Ho | 363/89 |
| 5,764,039 | 6/1998 | Choi et al. | 323/222 |

OTHER PUBLICATIONS

Unitrode Integrated Circuits, "High Power Factor Preregulator", pp. 6–287–6–294, Oct. 1994.

W. Shepherd and P. Zand, "Energy Flow And Power Factor In Nonsinusoidal Circuits", Cambridge University Press, pp. 1–77.

Arnold Hagiwara, Pioneer Magnetics, Santa Monica, CA, "Power Factor Correction For European Use".

PQTN Brief, "Harmonic Filter for Personal Computers: Passive, Parallel–Connected Series Resonant", EPRI Power Electronics Applications Center, Brief No. 1, Jun. 1992.

PQTN Brief, "Harmonic Filter for Personal Computers: Passive, Series–Connected, Parallel Resonant", EPRI Power Electronics Applications Center, Brief No. 5, Oct., 1992.

PQTN Brief, "Harmonic Filter for Personal Computers: Active Boost Converter", EPRI Power Electronics Applications Center, Brief No. 6, Nov. 1992.

*Primary Examiner*—Gopal C. Ray
*Attorney, Agent, or Firm*—Skjerven, Morrill, MacPherson, Franklin & Friel, LLP; Ken J. Koestner

[57] ABSTRACT

A power supply includes a power factor correction converter and a controller that disables a power factor correction converter when the power supply is operating in a low power mode, when the power factor correction converter is not needed. The controller of the power factor correction converter performs control operations as directed by a control program executing in a computer or processor in some embodiments. In other embodiments, the control operations are directed by an automatic sequence self-directed by a state machine or other sequencer according to a self-analysis.

22 Claims, 8 Drawing Sheets

SYSTEM AND METHOD FOR REDUCING POWER LOSSES BY GATING AN ACTIVE POWER FACTOR CONVERSION PROCESS

BACKGROUND OF THE INVENTION

1. Field of the Invention

The present invention relates to power supply circuits. More specifically, the present invention relates to power supply circuits and associated operating methods for power factor control.

2. Description of the Related Art

Computer systems and other electronic equipment are nearly universally powered by direct current (DC) while, for economic reasons, commercial electrical power is supplied in the form of alternating current (AC). To convert the AC power to DC power, computer systems and electronic equipment include a power supply for translating AC to DC power. Two types of power supplies are generally used to convert AC to DC power including linear power supplies and, more commonly, switching power supplies.

A linear power supply includes a transformer, one or more rectifiers, and a linear voltage regulator. The transformer reduces the voltage to a value slightly higher than the voltage required by the electronic circuits in the computer system or electronic equipment. The one or more rectifiers, usually semiconductor diodes, converts the reduced-voltage AC to DC by restricting the flow of electricity to one direction. The linear voltage regulator adjusts the voltage created by the power supply to a level suitable for usage in the computer system or electronic equipment circuits.

One example of a conventional embodiment of a switching power supply includes a silicon-controlled rectifier (SCR), a pulse width modulator, transformer, rectifier, and filtering circuit. The SCR converts the input power from a typical incoming line frequency of 60 Hz to a high frequency of about 20,000 Hz. While the SCR increases the frequency of the power signal, the pulse width modulator regulates the power signal by varying the duration of the power pulses, decreasing the pulse width to lower the output voltage. The transformer reduces the voltage to a suitable level for driving circuits. The rectifier and filtering circuit produce direct current power for usage by the computer system or electronic equipment.

Unfortunately both linear power supplies and switched power supplies introduce harmonic distortion into the power signal. For example, a switching power supply forms a nonlinear load and draws a pulse current having a waveform significantly different from the input voltage waveform. The drawn pulse current includes a fundamental current component and a plurality of harmonic current components. The fundamental current component has a waveform that matches the input voltage waveform and contributes to the power used by the power supply. However the harmonic current components contribute only to the RMS line current but not to usable power. Hence, harmonic distortion lowers the power that is available to the power supply.

A power factor is defined as the ratio of true power to apparent power. A resistive load has a current waveform and a voltage waveform that are identical and mutually in-phase. Therefore the power factor of a resistive load is equal to one, the maximum possible power factor. In contrast, the current waveform and the voltage waveform are different or out-of-phase, and the power factor is less than unity, for a load that is not purely resistive.

The high harmonic currents in a typical switching power supply leads to poor utilization of the power distribution system since the power generators of electrical utility companies need to generate RMS current even though the RMS current is not usable by the load. Furthermore, the high harmonic currents are wasteful, costly and damaging to electrical utility generating companies and electricity consumers. For example, circulating currents in the delta windings of three-phase power distribution transformers can cause temperatures in the transformers to rise to full load values before the transformers reach full load power levels. More precisely, the high energy content of the third harmonic subjects the neutral wire to an overload of 70%, possibly overloading branch circuit wiring when third harmonic current contributions from each of the three phases sum in the neutral conductor. In addition, the high harmonic currents add to stress on fuses, circuit breakers, wall sockets and wiring. The combination of a large number of personal computers or similar electronic loads operating on a common branch power circuit can distort the source-voltage wave shape considerably. An uncorrected power factor limits the output power and increases the line-current harmonics of a power supply.

As a result of the deleterious effects of harmonic distortion, governmental agencies in many nations have begun establishing standards limiting the harmonic current produced by electronic equipment and computer systems.

Various techniques have been developed to reduce harmonic distortion produced by electronic circuits. One technique for reducing harmonic distortion is to include in a power supply line a passive harmonic filter for reducing third harmonic current levels. Referring to FIG. 1, a schematic block diagram, labeled prior art, shows a parallel-connected resonant filter 102 connected between a variable utility source 104 and a power supply load RL. The resonant filter 102 compensates for nonfundamental demand and reduces the distortion component of the load current.

Also referring to FIG. 2, a schematic block diagram, labeled prior art, shows a series-connected resonant filter 202 which is useful for reducing harmonic distortions in computer systems and electronic circuits that employ a nonlinear or switching power supply. Nonlinear loads draw current discontinuously during the cycle of the input voltage waveform and produce low power factor ratio that is much smaller than the optimum unity power factor. The nonlinear loads therefore increase line current and limit the available capacity of branch circuits. The resonant filter 202 is designed to improve the power factor and decrease harmonic distortions from the power supply of a personal computer. The series-connected resonant filter 202 has an input connection to a variable utility power source 204 and an output connection to a power supply load 206 through a rectifier and filter capacitor 208.

FIG. 3, labeled prior art, shows an active boost converter circuit 302 for eliminating harmonic currents, thereby avoiding potential harmonic problems associated with the high harmonic current levels of personal computers. The active boost converter circuit 302 includes a power MOSFET 309 and operates as a switching device for eliminating harmonic distortion of the AC source current. The active boost converter circuit 302 is rated to match the power output rating of the power supply when fully loaded. The active boost converter circuit 302 has an input connection to a variable utility power source 304 through a rectifier 306. The active boost converter circuit 302 has an output connection to a variable power supply load 308. A filter capacitor $C_F$ is connected across the input lines to the variable power supply load 308. The active boost converter circuit 302 changes switch-mode power supply characteristics from nonlinear load characteristics to resistive load characteristics. The active boost converter circuit 302 generally produces a more linear load characteristic than either the parallel-connected resonant filter 102 or the series-connected resonant filter 202.

SUMMARY OF THE INVENTION

Regulatory agencies in many nations have determined a necessity for front end power factor correction in electronic equipment including computer systems, personal computers and the like. However, while regulations are imposed to handle maximum loads in electronic circuits, the minimum loads in computer systems will be reduced, driven by the Intel ACPI specification. Unfortunately, the combination of a power factor correction requirement and the reduction in minimum load will increase the amount of energy consumed by the power supply when a computer system is operated in a "sleep" ACPI mode or a "standby" ACPI mode. Active power factor-corrected power supplies consume an excessive level of power while operating in a low power mode.

Active power factor correction circuitry is typically an additional power conversion stage that is connected in series, preceding a main power conversion stage of a personal computer or server power supply. The power factor correction circuitry is supplied, according to governmental regulations, to substantially reduce the line harmonics of a power supply at high loads.

In accordance with the present invention, as the load is substantially reduced during low power modes of operation, such as the ACPI sleep and standby modes, the operation of the power factor correction circuitry becomes unnecessary. Furthermore, several watts of energy are consumed and wasted by usage of conventional power factor correction circuitry topologies.

What is needed is a new approach to power factor correction to substantially reduce harmonic distortion during high power and standard operating modes while reducing energy consumption when harmonic distortion is not a problem.

What is needed is a technique applied in computer systems with active power factor-corrected power supplies for reducing the excessive consumed power level when a computer system is operating in a low power mode.

In accordance with the present invention, a power supply includes a power factor correction converter and a controller that disables the power factor correction converter when the power supply is operating in a low power mode, when the power factor correction converter is not needed. The controller of the power factor correction converter performs control operations as directed by a control program executing in a computer or processor in some embodiments. In other embodiments, the control operations are directed by an automatic sequence self-directed by a state machine or other sequencer according to a self-analysis.

In accordance with the present invention, a power supply supports active power factor correction but reduces or deactivates power factor correction when harmonic distortion is substantially reduced or negligible.

In accordance with the present invention, a power supply supports active power factor correction but reduces personal computer or server power consumption when the personal computer or server is operating in a low power mode within the Intel ACPI guidelines.

Many advantages are achieved by the described power factor correction converter and controller for disabling the power factor correction converter. One advantage is that system energy requirements are substantially reduced when the computer system is operated in a low power mode according to the ACPI specification. The energy requirements are typically reduced through a programmed action of an operating system. A thermal advantage is also realized in the low power mode of operation with energy losses avoided by deactivating the power factor correction to advantageously reduced the burden on cooling of a computer system, a burden that is born by the power supply. With the cooling burden on the power supply reduced, a smaller amount of forced air is suitable for cooling the system allowing the fan (not shown) in the system to rotate slower. While the fan rotates at a slower speed, battery drain is advantageously reduced and acoustic noise is advantageously reduced in the low power sleep and stand-by operating states.

BRIEF DESCRIPTION OF THE DRAWINGS

The features of the described embodiments believed to be novel are specifically set forth in the appended claims. However, embodiments of the invention relating to both structure and method of operation, may best be understood by referring to the following description and accompanying drawings. The use of the same reference symbols in different drawings indicates similar or identical items.

DESCRIPTION OF THE ILLUSTRATIVE EMBODIMENT(S)

Figure 1:
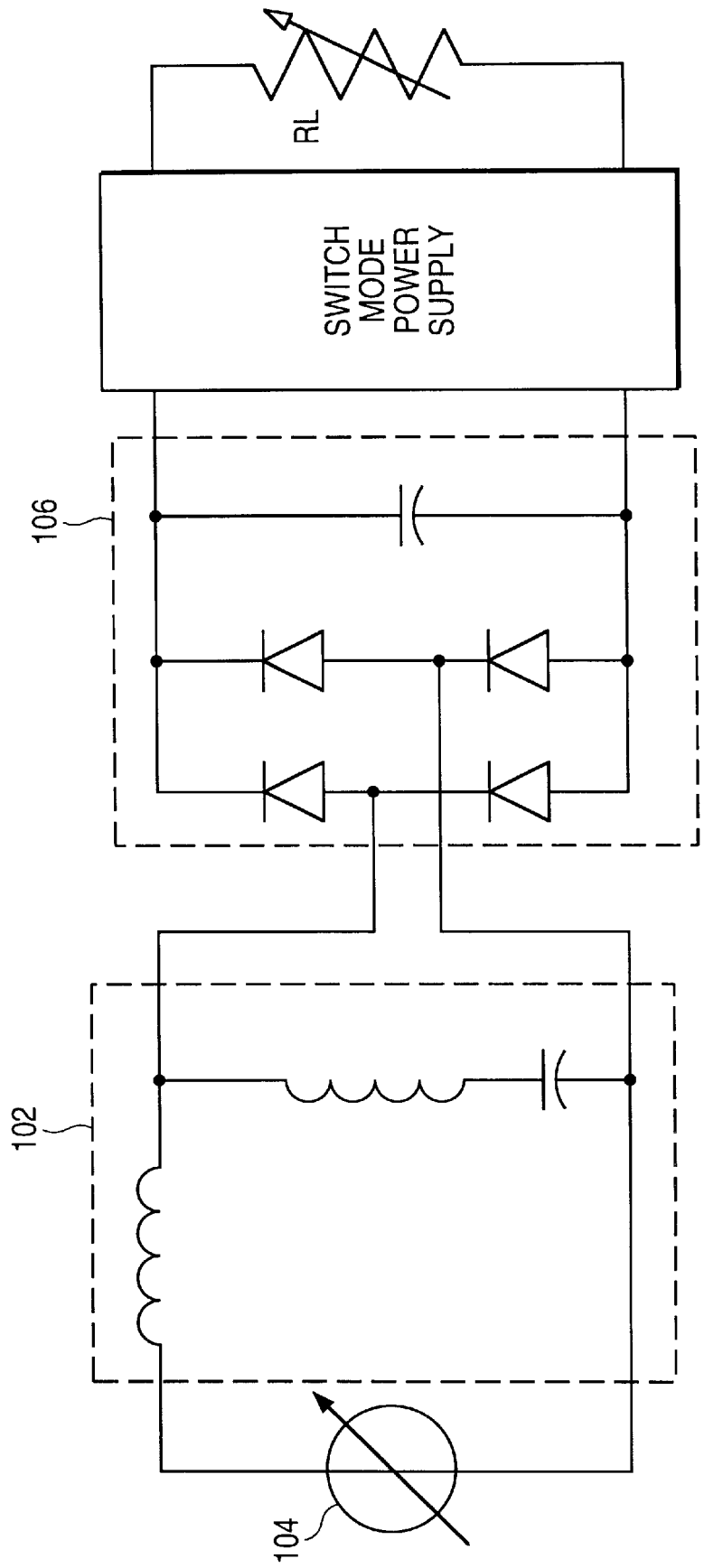
FIG. 1, labeled prior art, is a schematic block diagram showing a parallel-connected resonant filter connected between a variable utility source and a power supply load.
Figure 2:
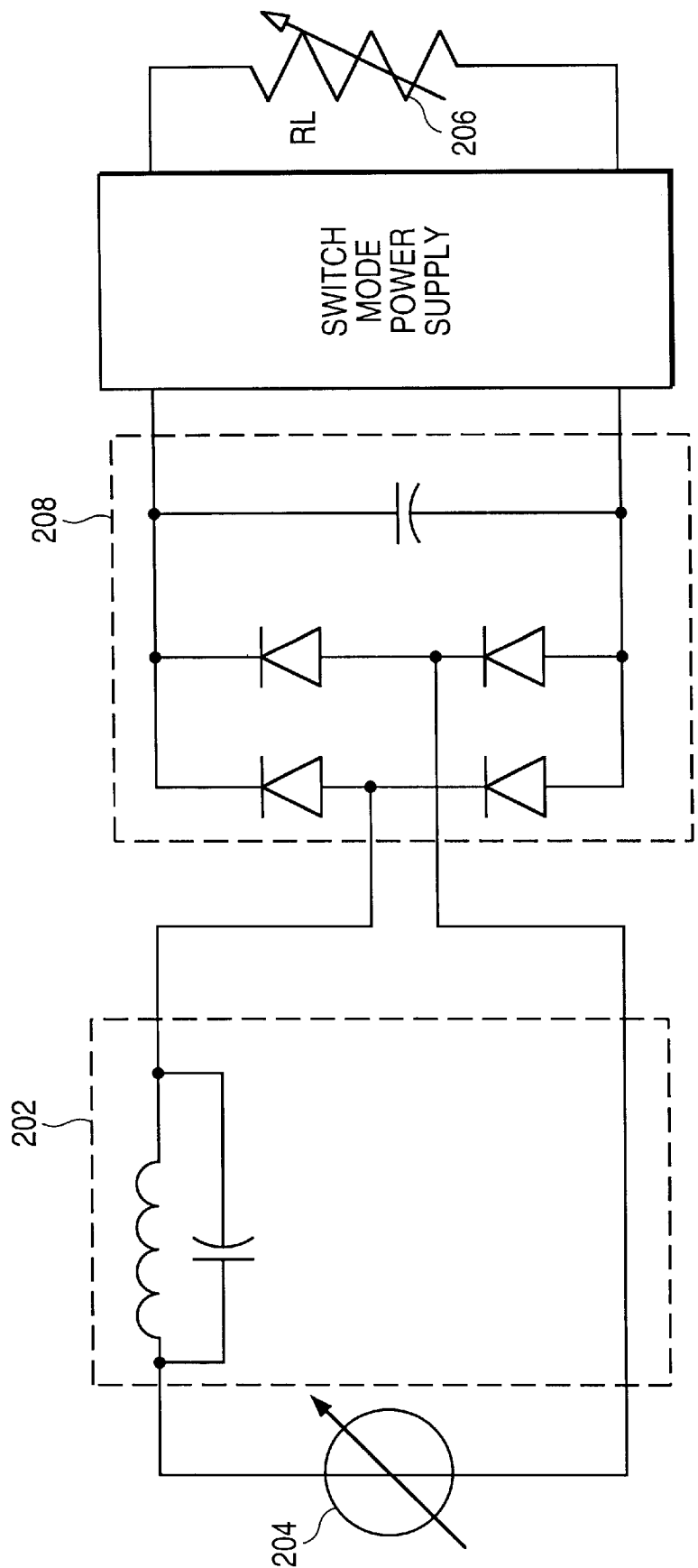
FIG. 2, labeled prior art, illustrates a schematic block diagram of a series-connected resonant filter which is useful for reducing harmonic distortions in computer systems and electronic circuits that employ a nonlinear or switching power supply.
Figure 3:
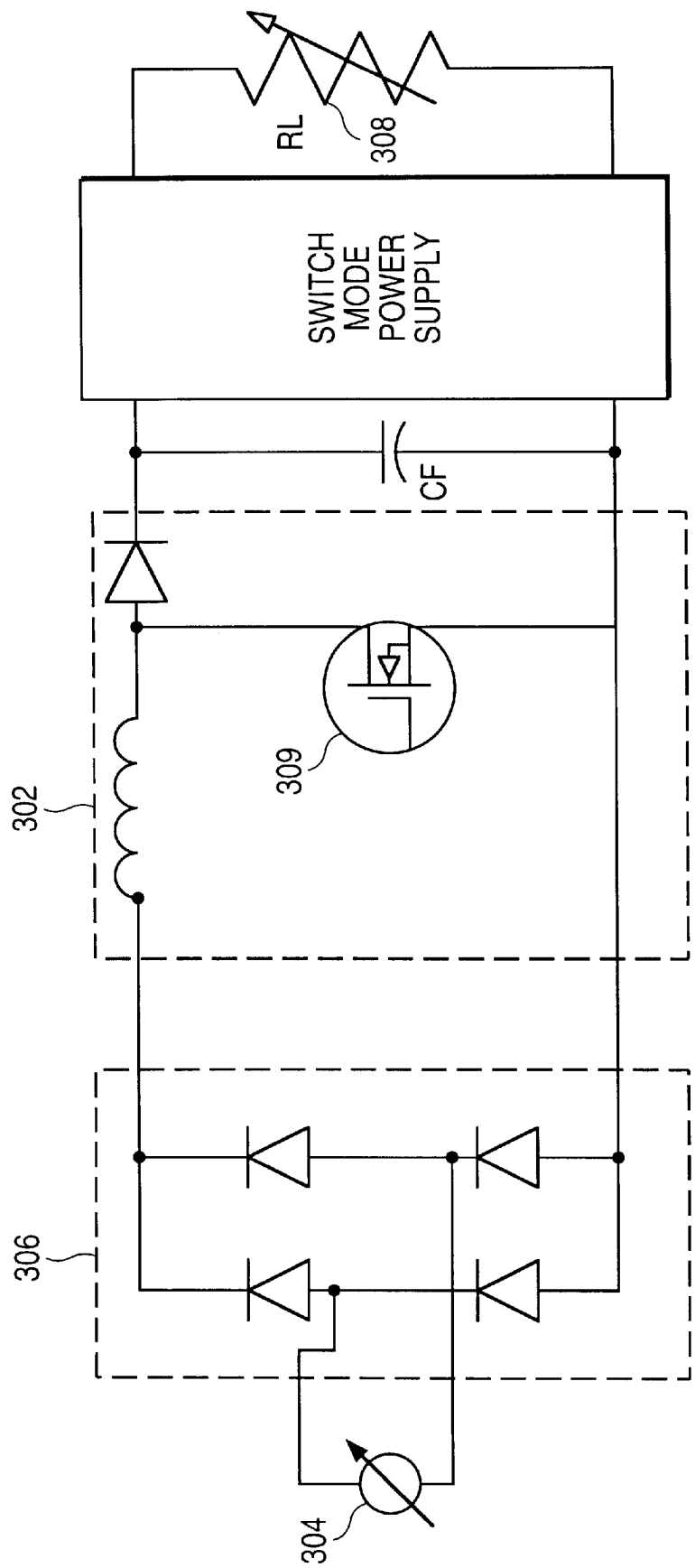
FIG. 3, labeled prior art, is a schematic block diagram showing an active boost converter circuit for eliminating harmonic currents, thereby avoiding potential harmonic problems associated with the high harmonic current levels of personal computers.
Figure 4:
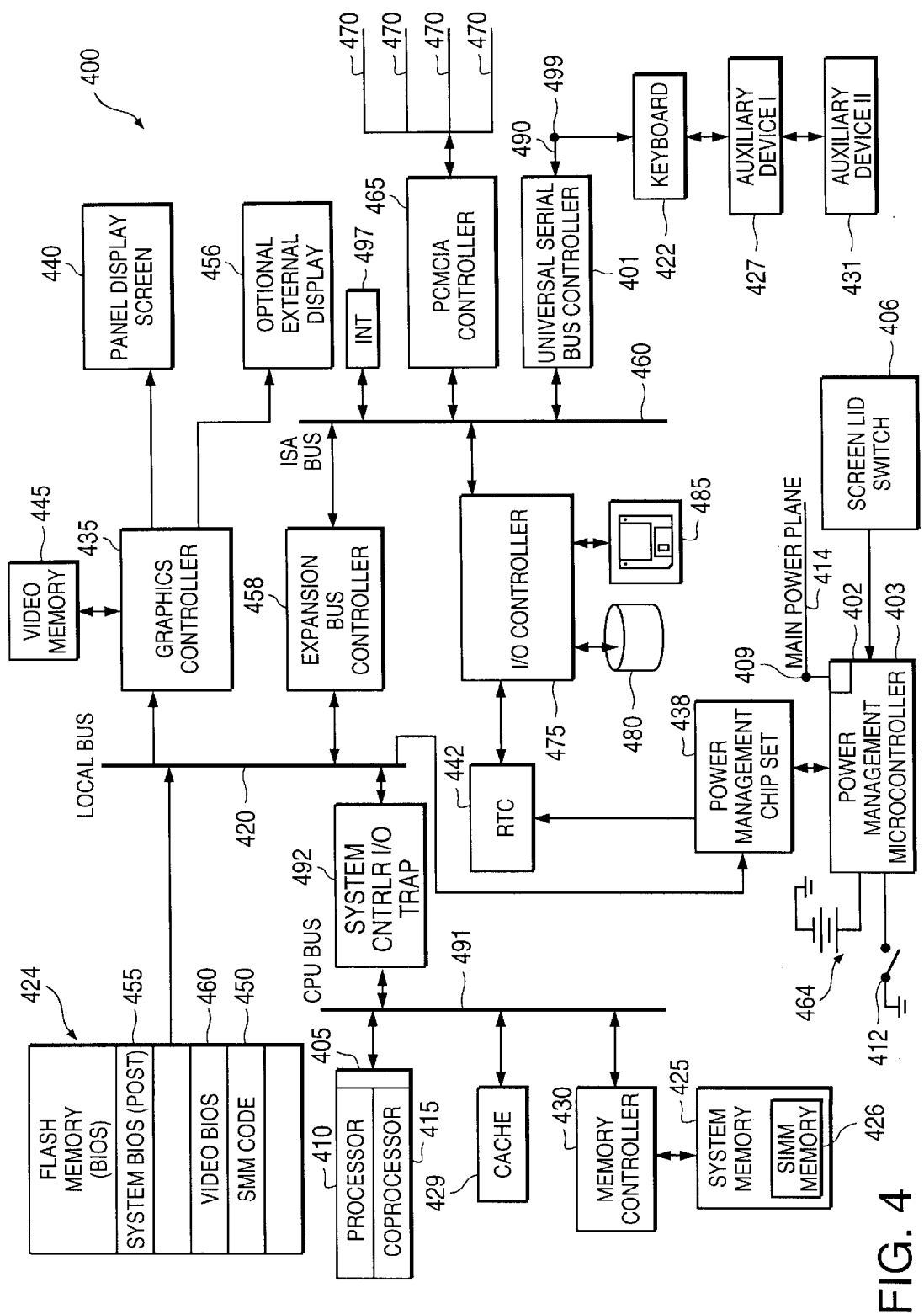
FIG. 4 is a schematic block diagram illustrating a computer system including a switching regulator for converting utility AC power to regulated DC power.

Referring to FIG. 4, a schematic block diagram illustrates a computer system 400. The computer system 400 includes a switching regulator 402 for converting utility AC power to regulated DC power. The switching regulator 402 is typically a single-phase nonlinear supply that generates a high third harmonic.

Figure 5:
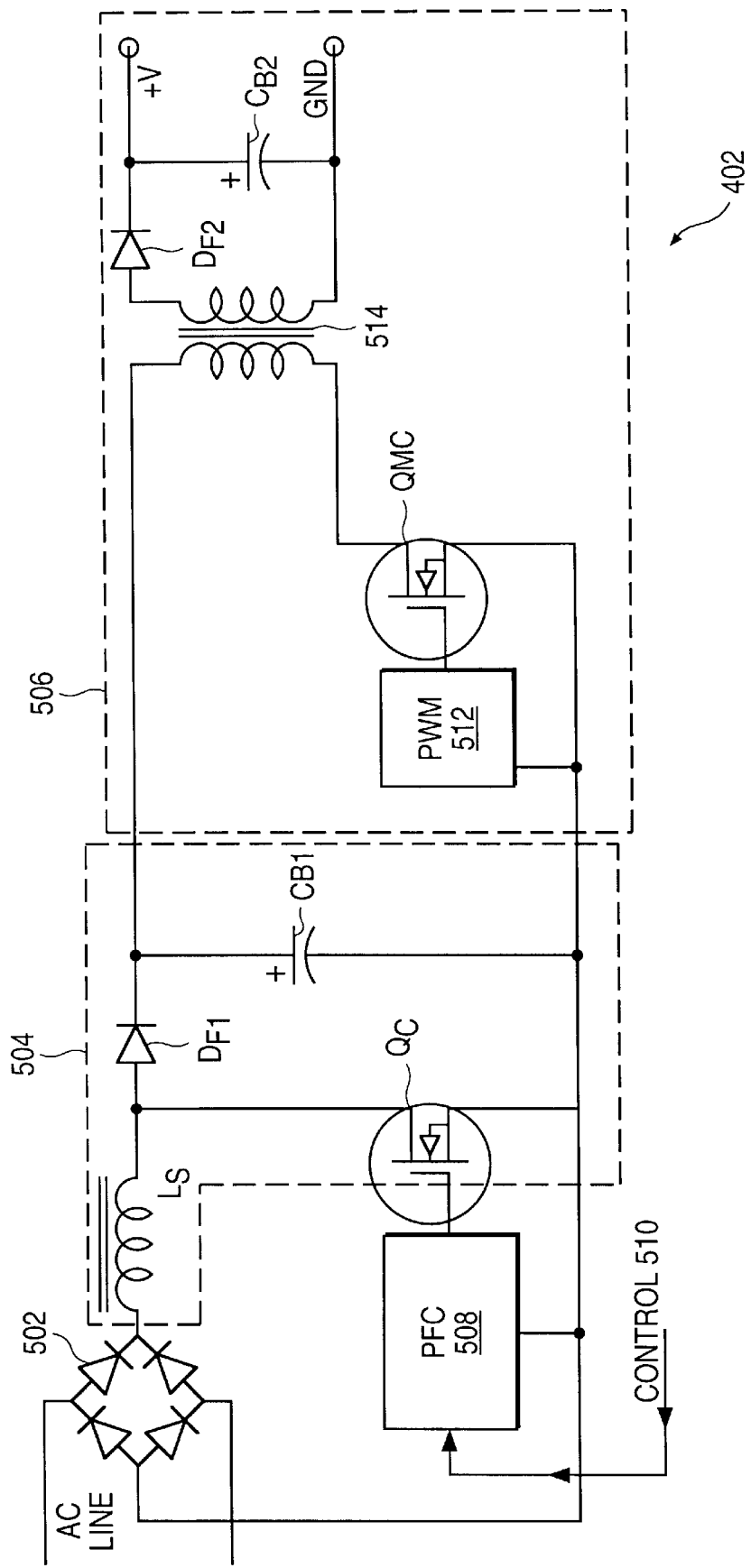
FIG. 5 is a schematic block diagram illustrating an embodiment of the switching regulator shown in FIG. 4.

Referring to FIG. 5, a schematic block diagram illustrates an embodiment of the switching regulator 402. The switching regulator 402 includes an input bridge rectifier 502, a boost connector stage 504, and a main power converter stage 506. The input bridge rectifier 502 has positive and negative input connections from an AC line 500 and two output connections to the boost connector stage 504.

The boost connector stage 504 includes a storage inductor $L_S$, a control device $Q_C$, a power factor controller 508, a flyback diode $D_{F1}$, and a bulk capacitor $C_{B1}$. A first of the two output connections of the input bridge rectifier 502 is connected to a storage inductor $L_S$, which is, in turn, connected to a drain terminal of a control device $Q_C$. The illustrative control device $Q_C$ is an N-channel MOSFET. A second of the two output connections of the input bridge rectifier 502 is connected to the source terminal of the control device $Q_C$ and to a power factor controller 508. The power factor controller 508 receives one or more control signals from a control source 510. In various embodiments, the control source 510 is selected from different sources including a microprocessor or signals derived from voltage measurement acquired at the output terminals of the switching regulator 402. The power factor controller 508 has a gate drive output terminal connected to a gate terminal of the control device $Q_C$. The flyback diode $D_{F1}$ is connected between the storage inductor $L_S$ and the main power converter stage 506. The bulk capacitor $C_{B1}$ is connected between an output terminal of the flyback diode $D_{F1}$ and the source terminal of the control device $Q_C$, across the input terminals of the main power converter stage 506.

The storage inductor $L_S$, control device $Q_C$, and flyback diode $D_{F1}$ in the boost connector stage 504 form an active boost converter circuit that is controlled by the power factor controller 508. The active boost converter circuit advantageously forms a passive current path from the input terminal to the output terminal of the boost connector stage 504 when the control device $Q_C$ is not functioning. The passive current path is supplied by the storage inductor $L_S$ and the flyback diode $D_{F1}$. The bulk capacitor $C_{B1}$ in the boost connector stage 504 stores a peak charge supplied by the input bridge rectifier 502 when the control device $Q_C$ remains deactivated. The peak charge stored by the bulk capacitor $C_{B1}$ of the boost connector stage 504 supply energy to the main power converter stage 506.

When a computer system is operated in a low power mode according to the ACPI specification, system energy requirements are substantially reduced, typically through a programmed action of an operating system. During the low power operating mode, the energy support requirements of the bulk capacitor $C_{B1}$ for supplying energy to the main power converter stage 506 are also substantially reduced. Advantageously, even though the bulk capacitor $C_{B1}$ is charged to a peak level only every half cycle of the AC line voltage maximum, the energy level stored in the bulk capacitor $C_{B1}$ remains adequate during the low power operating mode.

A thermal advantage is also realized by the illustrative embodiment. In the low power mode of operation, the energy losses avoided by deactivating the power factor correction advantageously reduced the burden on cooling of a computer system, a burden that is born by the power supply. With the cooling burden on the power supply reduced, a smaller amount of forced air is suitable for cooling the system allowing the fan (not shown) in the system to rotate slower. While the fan rotates at a slower speed, battery drain is advantageously reduced and acoustic noise is advantageously reduced in the low power sleep and stand-by operating states.

The main power converter stage 506 includes a pulse width modulator 512, a main power converter control device $Q_{MC}$, a single-phase half-wave rectifier 514, and a bulk capacitor $C_{B2}$. The illustrative main power converter control device $Q_{MC}$ is an N-channel MOSFET. The single-phase half-wave rectifier 514 has a primary winding connected between the output terminal of the flyback diode $D_{F1}$ and a drain terminal of the main power converter control device $Q_{MC}$. The main power converter control device $Q_{MC}$ also has a source terminal connected to the second output connection of the input bridge rectifier 502. The pulse width modulator 512 is connected to the second output connection of the input bridge rectifier 502 and has a control output terminal connected to a gate terminal of the main power converter control device $Q_{MC}$. The bulk capacitance $C_{B2}$ is formed between terminals of the secondary winding of the single-phase half-wave rectifier 514. The bulk capacitance $C_{B2}$ increases the output voltage of the single-phase half-wave rectifier 514 and decreases the voltage ripple. The output voltage and the amount of filtering are set by the value of the bulk capacitance $C_{B2}$ in relation to the load current. A first terminal of the secondary winding supplies a positive DC voltage connection +V to an electronic circuit, such as a computer system 400. A second terminal of the secondary winding supplies a ground reference connection GND to the electronic circuit.

Figure 6:
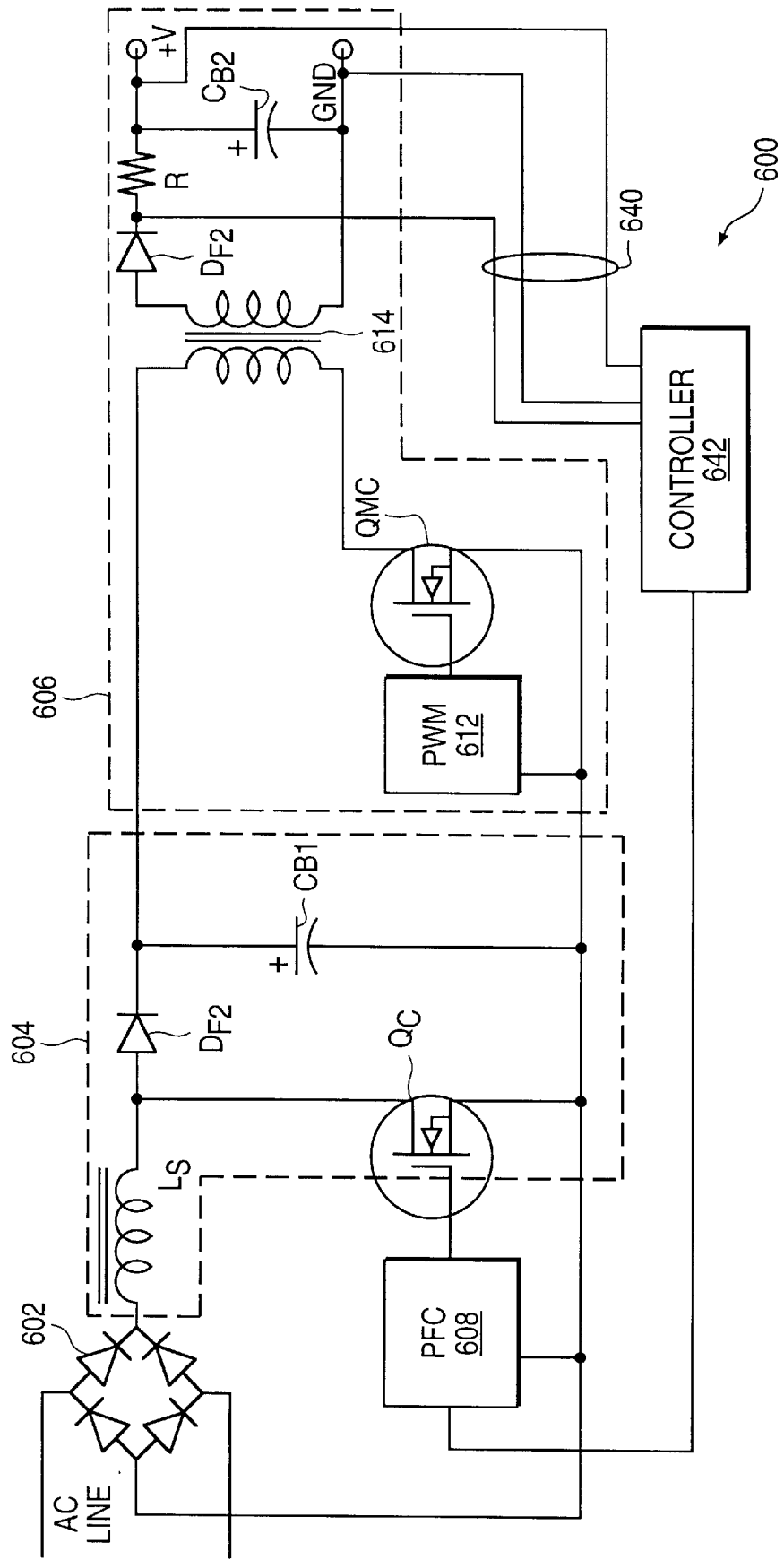
FIG. 6 is a schematic block diagram illustrating an embodiment of a switching regulator which includes sensors and a controller connected to the sensors for sensing electrical parameters such as voltage and current flow in the secondary winding of a single-phi half-wave rectifier.

Referring to FIG. 6, a schematic block diagram illustrates an embodiment of a switching regulator 600. The switching regulator 600 is similar to the switching regulator 500 shown in FIG. 5 but further includes sensors 640 and a controller 642 connected to the sensors 640 for sensing electrical parameters such as voltage and current flow in the secondary winding of a single-phase half-wave rectifier 614. In the illustrative embodiment, the sensors 640 are simply connections to a positive DC voltage output connection +V of the switching regulator 600, a ground reference output connection GND of the switching regulator 600, and a connection for measuring current across a load resistor R driven by the positive DC voltage. These connections are used by the controller 642 for measuring current and voltage at the DC output terminals of the switching regulator 600, and thereby determining the power consumed in the circuit. The controller 642 senses selected electrical parameters, performs a control process to determine a control signal for application to a gate terminal of a control device $Q_C$, and communicates the control signal to a power factor controller 608. Accordingly, the switching regulator 600 performs control operations based on electrical conditions on the secondary side of the single-phase half-wave rectifier 614 which are detected and fed back to control the primary side of the single-phase half-wave rectifier 614 via the power factor controller 608.

In various embodiments, the controller 642 may be implemented as a control logic, a state machine, a microprocessor, a microcontroller, a computer, or the like. The controller 642 includes a sufficient control logic or program code for supplying primary side self analysis for deriving control signals for controlling the power factor controller 608.

Figure 7:
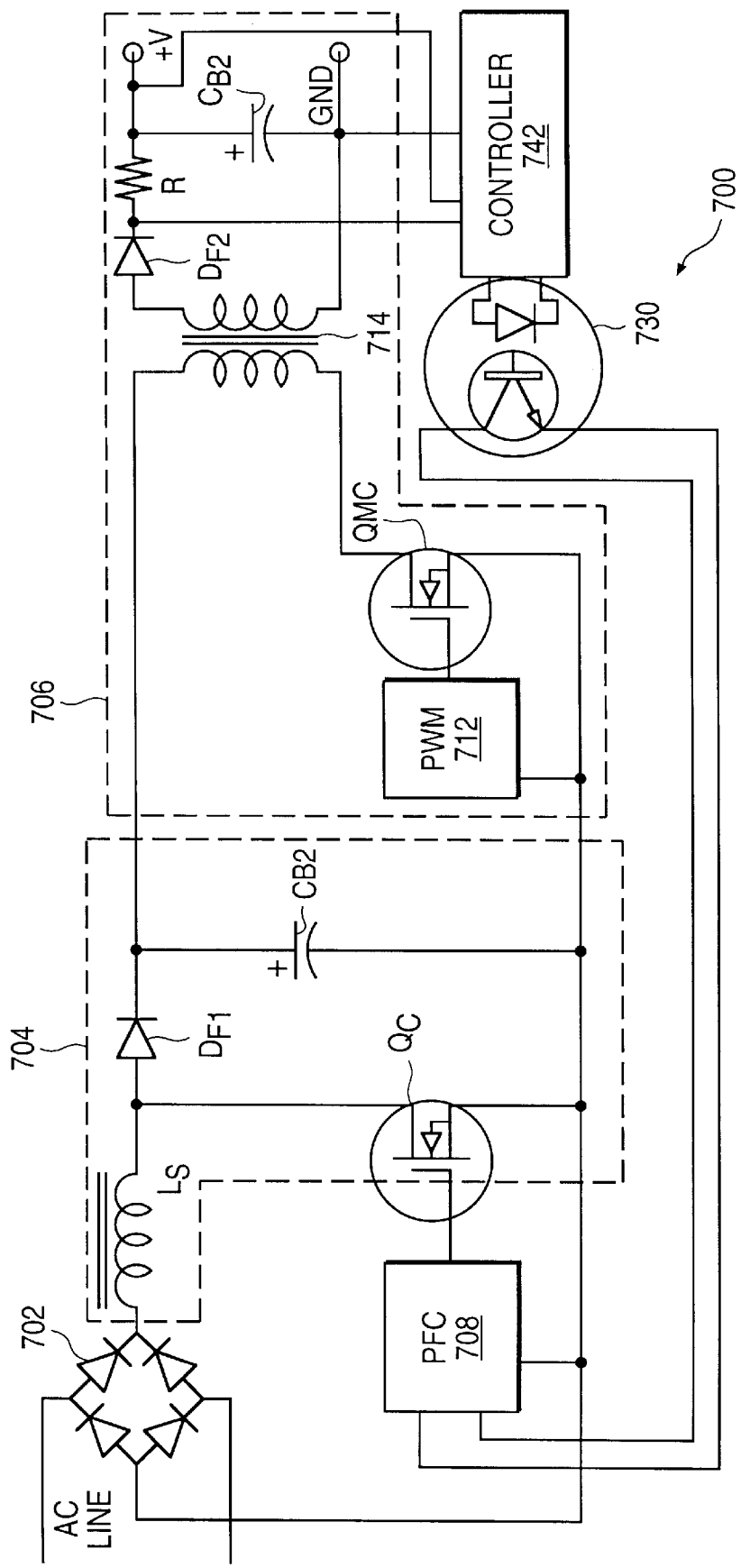
FIG. 7 is a schematic block diagram illustrating an embodiment of a switching regulator including a signal coupler for communicating signals indicative of sensed electrical parameters from a secondary winding to a primary winding of a rectifier.

Referring to FIG. 7, a schematic block diagram illustrates an embodiment of a switching regulator 700. The switching regulator 700 is similar to the switching regulator 500 shown in FIG. 5 but further includes a signal coupler 730. The signal coupler 730 is connected to the power factor controller 708 to control the power conversion process. In the illustrative embodiment, the signal coupler 730 is an optoelectronic coupler to advantageously control the primary winding of the power factor controller 708 from the secondary winding of the single-phase half-wave rectifier 714 while mutually isolating AC and DC power.

The controller receives signals indicative of the DC voltage and current at the output terminals of the switching regulator 700. DC power is determined from the DC current and voltage and compared to a threshold level indicative of a sleep or standby state. If the DC power is below the threshold level, then the controller 742 deactivates the power factor controller 708.

Figure 8:
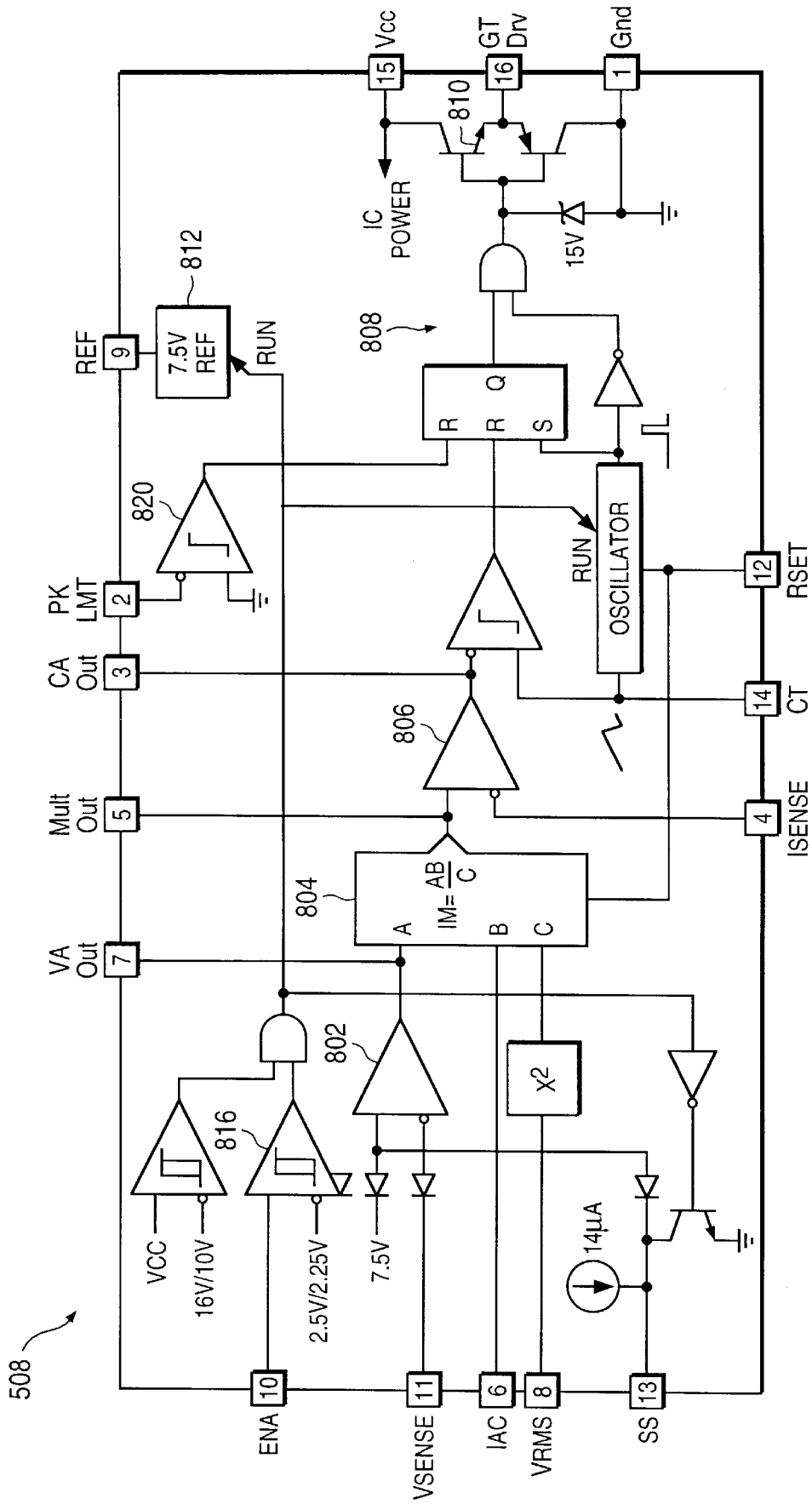
FIG. 8 is a schematic block diagram illustrating an embodiment of a power factor controller for usage in a switching regulator.

Referring to FIG. 8, a schematic block diagram illustrates an embodiment of a power factor controller 508. The power factor controller 508 performs active power factor correction for power systems that otherwise draw nonsinusoidal current from sinusoidal power lines. The power factor controller 508 generally implements control functions suitable for constructing a power supply for optimally using available power-line current while reducing line-current distortion. Examples of suitable power factor controllers include PFC model numbers UC1854, UC2854, and UC3854 which are available from Unitrode Corporation. The power factor controller 508 includes a voltage amplifier 802, an analog multiplier/divider 804, a current amplifier 806, and a fixed-frequency pulse width modulator 808. The power factor controller 508 also includes a power MOSFET compatible gate driver 810, a 7.5 volt reference 812, a line anticipator 814, a load-enable comparator 816, a low-supply detector 818, and an over-current comparator 820.

The power factor controller 508 uses average current mode control operations to achieve fixed-frequency control with stability and low distortion. Unlike peak current mode control, average current mode accurately maintains sinusoidal line current without performing slope compensation and with minimal response to noise transients.

The power factor controller 508 has a high reference voltage and high oscillator amplitude which combine to reduce noise sensitivity while fast pulse width modulator elements allow chopping frequencies above 200 kHz.

Referring again to FIG. 4, the computer system 400 also includes a microprocessor 405 which may also be called a CPU. In some embodiments, the microprocessor 405 is, for example, an Intel™ Pentium class microprocessor or Intel™ 80486 class microprocessor. The microprocessor 405 has a processor 410 for calculating integer operations and a coprocessor 415 for calculating floating point operations. Microprocessor 405 is connected to a cache 429 and a memory controller 430 via a CPU bus 491. The cache 429 may include both a primary cache (not shown) and a secondary cache (not shown).

A system controller I/O trap circuit 492 connects the CPU bus 491 to a local bus 420. The system controller I/O trap circuit 492 is generally characterized as part of a system controller such as a Pico Power Vesuvious or an Intel™ Mobile Triton chip set. In some embodiments, the system controller I/O trap circuit 492 is programmed to intercept a particular target address or address range. Upon intercepting a target address, the system controller I/O trap circuit 492 asserts an intercept signal indicating that the microprocessor 405 has attempted to access the target address.

In the some embodiments, the intercept signal is connected to an SMI ("system management interrupt") pin of the microprocessor 405, causing the microprocessor 405 to enter system management mode ("SMM").

A main memory 425, typically assembled from a plurality of dynamic random access memory ("DRAM") modules, is connected to the local bus 420 by a memory controller 430. The main memory 425 includes a system management mode memory area which is employed to store converter code to implement conversion methodology embodiments as will be discussed in more detail subsequently.

A Basic Input Output System ("BIOS") memory 424 is connected to local bus 420. A FLASH memory or other nonvolatile memory is used as BIOS memory 424. BIOS memory 424 stores the system code which controls some operations of the computer system 400.

A graphics controller 435 is connected to the local bus 420 and to a panel display screen 440. The graphics controller 435 is also connected to a video memory 445 which stores information to be displayed on panel display 440. The panel display 440 is typically an active matrix or passive matrix liquid crystal display ("LCD") although other display technologies may be used as well. Graphics controller 435 is optionally connected to an optional external display or standalone monitor display 456. One example of a suitable graphics controller for usage as the graphics controller 435 is the Western Digital WD90C24A graphics controller.

A bus interface controller or expansion bus controller 458 connects the local bus 420 to an expansion bus 460. In the illustrative embodiment, expansion bus 460 is an Industry Standard Architecture ("ISA") bus although other buses, for example, a Peripheral Component Interconnect ("PCI") bus, may otherwise be used. A PCMCIA ("Personal Computer Memory Card International Association") controller 465 is connected to expansion bus 460. The PCMCIA controller 465 is connected to a plurality of expansion slots 470 to receive PCMCIA expansion cards such as modems, fax cards, communications cards, and other input/output devices. An interrupt request generator 497 is also connected to the ISA bus 460 and issues an interrupt service request over a predetermined interrupt request line after receiving a request signal from the processor 405 requesting issuance of an interrupt.

An I/O controller 475 is connected to ISA bus 460. The I/O controller 475 is interfaced to both an integrated drive electronics ("IDE") hard drive 480 and a floppy diskette drive 485.

A USB controller 401 transfers data to and from the processor 410 via the ISA bus 460. A keyboard 422, auxiliary device I, and auxiliary device II are connected serially to a USB connector 499. This interconnection topology is implemented according the USB technology standard. External devices which include keyboard 422, auxiliary device I, and auxiliary device II communicate with microprocessor 405 via the USB controller 401. Auxiliary devices are typically communication devices such as a mouse, a modem, a joystick, or another computer system. When USB controller 401 receives data from the connected external devices, USB controller 401 issues an interrupt request to the microprocessor 405. The microprocessor 405 interprets the interrupt request as a request for service from a conventional communication interface and attempts to process the interrupt request accordingly. However, a USB servicing routine is executed instead.

The computer system 400 includes a power supply 464, such as a battery, which supplies operating power to the many devices of the computer system 400. The power supply 464 in the computer system 400 is a rechargeable battery, such as a nickel metal hydride ("NiMH") or lithium ion battery. The power supply 464 is connected to a power management microcontroller 408 which operates in the manner of an AC line adapter and controls the distribution of power from power supply 464. More specifically, the power control microcontroller 408 includes a power output terminal 409 connected to a main power plane 414 which supplies power to microprocessor 405. The power management microcontroller 408 is also connected to a power plane (not shown) supplying operating power to panel display 440. In the illustrative embodiment, the power control microcontroller 408 is a Motorola 6805 microcontroller. The power control microcontroller 408 monitors the charge level of the power supply 464 to determine when to charge a battery 464 and when to deny a charging voltage to the battery 464. The power control microcontroller 408 is connected to a main power switch 412 which the user actuates to turn on or shut off the computer system 400. While the power control microcontroller 408 powers down other portions of the computer system 400 such as hard drive 480 when not in use to conserve power, the power control microcontroller 408 itself is always connected to a source of energy, namely power supply 464.

The computer system 400 also includes a screen lid switch 406 or indicator for indicating when the panel display 440 is in the open or closed positions. The panel display 440 is generally located in the typical lid location for "clamshell" types of portable computers such as laptop or notebook computers. The panel display 440 forms an integral part of the lid of the computer and is set in either an open position with the screen accessible for usage or a closed condition for storage and porting.

The computer system 400 also includes a power management chip set 438 which includes power management chip models PT86C521 and PT86C22 manufactured by Pico Power. The power management chip set 438 is connected to microprocessor 405 via local bus 420 so that the power management chip set 438 receives power control commands from microprocessor 405. The power management chip set 438 is connected to a plurality of individual power planes supplying power to respective devices in the computer system 400 such as the hard drive 480 and floppy diskette drive 485, for example. The power management chip set 438 operates under control of the microprocessor 405 to control the power to the various power planes and devices of the computer. A real time clock ("RTC") 440 is connected to the I/O controller 475 and the power management chip set 438 so that time events or alarms are transmitted to the power management chip set 438. The real time clock 440 is typically programmed to generate an alarm signal at a predetermined time.

When the computer system 400 is turned on or powered up, the system BIOS software stored in non-volatile BIOS memory 424 is copied into main memory 425 to execute instructions more quickly in a technique called "shadowing" or "shadow RAM". At this time, an SMM program code 450 is also copied into the system management mode memory area 426 of main memory 425. The microprocessor 405 executes SMM code 450 after the microprocessor 405 receives a system management interrupt ("SMI") which causes the microprocessor to enter system management mode (SMM) operation. In addition to the SMM code 450, a video BIOS 462 and a system BIOS program code 455 including a power-on self-test (POST) module are stored in the BIOS memory 424 and copied into main memory 425 at power-up. Alternative memory mapping schemes may also be used. For example, SMM code 450 may be stored in fast SRAM memory (not shown) connected to the local/CPU bus 420.

While the invention has been described with reference to various embodiments, it will be understood that these embodiments are illustrative and that the scope of the invention is not limited to them. Many variations, modifications, additions and improvements of the embodiments described are possible. For example, although the switching regulators 402, 600, and 700 illustratively employ a single-phase half-wave rectifier in other embodiments other types of rectifier circuits may be used, such as a single-phase half-wave rectifier, a single-phase bridge rectifier, a single-phase center tap rectifier, a Wye (three-phase star) rectifier, a three-phase bridge rectifier, a sixphase star rectifier, a three-phase double Wye with an interphase transformer, and the like.

What is claimed is:

1. A power supply comprising:

a power converter coupled to an AC current source for converting operating power to DC;

a power factor correction converter coupled to the power converter; and a controller coupled to the power converter and coupled to the power factor correction converter for determining when the power converter is operating in a low power mode and deactivating the power factor correction converter when the power converter is operating in the low power mode.

2. A power supply according to claim 1 wherein:

the controller includes:

a processor;

a memory coupled to the processor; and a program code stored in the memory and executable on the processor.

3. A power supply according to claim 2 wherein the program code is an executable program code executing in a Basic Input/Output System (BIOS).

4. A power supply according to claim 1 wherein:

the controller further includes:

a control logic for performing an automatic self-directed sequence of operations.

5. A power supply according to claim 1 wherein:

the controller further includes:

a state machine sequencer for performing an automatic self-directed sequence of operations.

6. A power supply according to claim 1 further comprising:

an active boost converter circuit operating as a switching device for eliminating harmonic distortion of the AC source current.

7. A power supply according to claim 1 further comprising:

an optoelectronic switching coupler coupled between the power converter and the power factor correction converter for communicating an operating power status.

8. A computer system comprising:

a processor;

a power supply coupled to the processor, the power supply further including:

a power converter coupled to an AC current source for converting operating power to DC;

a power factor correction converter coupled to the power converter; and a controller coupled to the power converter and coupled to the power factor correction converter for determining when the power converter is operating in a low power mode and deactivating the power factor correction converter when the power converter is operating in the low power mode.

9. A computer system according to claim 8 wherein:

the controller further includes:

a processor;

a memory coupled to the processor; and a program code stored in the memory and executable on the processor.

10. A computer system according to claim 9 wherein the program code is an executable program code executing in a Basic Input/Output System (BIOS).

11. A computer system according to claim 8 wherein:

the controller further includes:

a control logic for performing an automatic self-directed sequence of operations.

12. A computer system according to claim 8 wherein:

the controller further includes:

a state machine sequencer for performing an automatic self-directed sequence of operations.

13. A computer system according to claim 8 wherein:

the power supply further comprises:

an active boost converter circuit operating as a switching device for eliminating harmonic distortion of the AC source current.

14. A computer system according to claim 8 wherein the power supply further comprises:

an optoelectronic switching coupler coupled between the power converter and the power factor correction converter for communicating an operating power status.

15. A computer system comprising:

a processor;

a switching regulator coupled to the processor, the switching regulator further including:

an input bridge rectifier;

a boost connector stage coupled to the input bridge rectifier;

a main power converter stage; and a controller coupled to the main power converter stage and coupled to the boost connector stage for determining when the main power converter stage is operating in a low power mode and deactivating the boost connector stage when the main power converter stage is operating in the low power mode.

16. A computer system according to claim 15 wherein:

the input bridge rectifier has a positive input terminal coupled to a positive AC line and a negative input terminal coupled to a negative AC line and a first output terminal and a second output terminal coupled to the boost connector stage.

17. A computer system according to claim 16 wherein:

the boost connector stage includes:

a storage inductor coupled to the first output terminal of the input bridge rectifier;

a diode coupled to the storage inductor at a node;

a control device having a current conducting pathway coupled from the node to the second output terminal of the input bridge rectifier; and a filter capacitor coupled from the diode to the second output terminal of the input bridge rectifier.

18. A computer system according to claim 17 wherein:

the control device is a MOSFET.

19. A computer system according to claim 17 wherein:

the boost connector stage further includes:

a power factor controller having an input terminal coupled to a control source and an output terminal coupled to a control terminal of the control device.

20. A computer system according to claim 19 wherein:

the storage inductor, the control device, and the diode, in combination, form an active boost converter circuit that is controlled by the power factor controller.

21. A computer system according to claim 20 wherein:

the active boost converter circuit forms a passive current path from an input terminal to an output terminal of the boost connector stage when the control device is not functioning, the passive current path being established by the storage inductor and the diode.

22. A computer system according to claim 20 wherein:

the filter capacitor in the boost connector stage stores a peak charge supplied by the input bridge rectifier when the control device remains deactivated; and the peak charge stored by the filter capacitor of the boost connector stage supplies energy to the main power converter stage.

* * * * *